US006182347B1

(12) United States Patent
Reed et al.

(10) Patent No.: US 6,182,347 B1
(45) Date of Patent: Feb. 6, 2001

(54) DISCONNECT TOOL FOR A SPRING-LOCK® CONNECTOR

(75) Inventors: Robert Raymond Reed, Greer; Frederick Louis Grimm, deceased, late of Greer, both of SC (US), by, Leah Meredith Grimm, legal representative

(73) Assignee: Patent Consultants & Services, Inc., Greer, SC (US)

(*) Notice: Under 35 U.S.C. 154(b), the term of this patent shall be extended for 0 days.

(21) Appl. No.: 09/455,889

(22) Filed: Dec. 6, 1999

(51) Int. Cl.⁷ .............................. B23P 19/02; B23P 19/04
(52) U.S. Cl. ............................ 29/426.5; 29/237; 285/39
(58) Field of Search ............................. 29/237, 426.1, 29/426.5; 285/39, 308, 318

(56) References Cited

U.S. PATENT DOCUMENTS

| Re. 33,946 | 6/1992 | Corzine ................................... 285/45 |
| 3,711,125 | 1/1973 | Dehar ..................................... 285/111 |
| 4,055,359 | 10/1977 | McWethy ............................... 285/39 |
| 4,401,326 | 8/1983 | Blair ...................................... 285/318 |
| 4,632,434 | 12/1986 | Proctor et al. .......................... 285/39 |
| 4,728,130 | 3/1988 | Corzine ................................. 285/351 |
| 5,084,954 | * 2/1992 | Klinger .................................. 29/237 |
| 5,094,494 | 3/1992 | McConnell ............................ 285/318 |
| 5,112,085 | * 5/1992 | Busch et al. ............................ 285/39 |
| 5,301,408 | * 4/1994 | Berman et al. ........................ 29/237 |
| 5,455,995 | 10/1995 | Pool ........................................ 285/39 |
| 5,471,728 | * 12/1995 | Feese et al. ............................. 29/237 |
| 5,480,193 | 1/1996 | Echols et al. ........................... 285/46 |
| 5,483,731 | * 1/1996 | Prendel et al. ......................... 29/237 |
| 5,529,348 | 6/1996 | Wasserman et al. ................. 285/286 |
| 5,664,309 | * 9/1997 | Albrecht ................................. 29/237 |
| 5,671,520 | 9/1997 | Scarborough .......................... 29/237 |

OTHER PUBLICATIONS

Spring Lock Coupling Tool, Model T 70046, Manufactured by AmPro Tools Corporation of Los Angeles, California 90015.
Disconnect Tool Set, Model 25052, Manufactured by OEM Company, Mineola, New York 11501.

\* cited by examiner

Primary Examiner—S. Thomas Hughes
Assistant Examiner—Eric Compton
(74) Attorney, Agent, or Firm—Robert R. Reed

(57) ABSTRACT

The present invention provides a disconnect tool with a pair of fixtures having a central tool aperture or bore. The fixtures of the tool are placed around a second fitting of a spring-lock® type connector of a tubular conduit or pipe to be disconnected along a tubular axis of the conduit. The fixtures also provide a cage aperture to receive a cage portion of a first fitting of the connector. A pair of annular projecting collars extend between the tool aperture and the cage apertures. A pair of handles each have a lever arm and a shaft that is rotationally retained in a cylindrical bore of a respective fixture. The shafts of the handles each have a cutout forming a prying surface exposed to the cage bore within the respective fixture. In a first operating mode the fixtures are displaced along the tubular axis so that the collars inter a chamber of the cage and contact a circular locking spring within the cage. In a second operating mode the lever arms are rotated in one direction so that prying surfaces of the shafts contact one outer side of the cage and the collars are pulled further into the cage and displace the locking spring within the cage. In a third operating mode the handles are forced together to grip the second fitting of the connector, the lever arms are rotated in an opposite direction so that prying surfaces of the shafts contact the other outer side of the cage and move the first and second fittings relative to one another along the tubular axis so the connector can be disconnected.

17 Claims, 12 Drawing Sheets

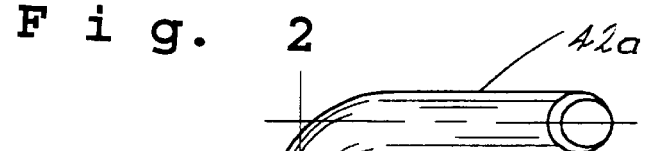
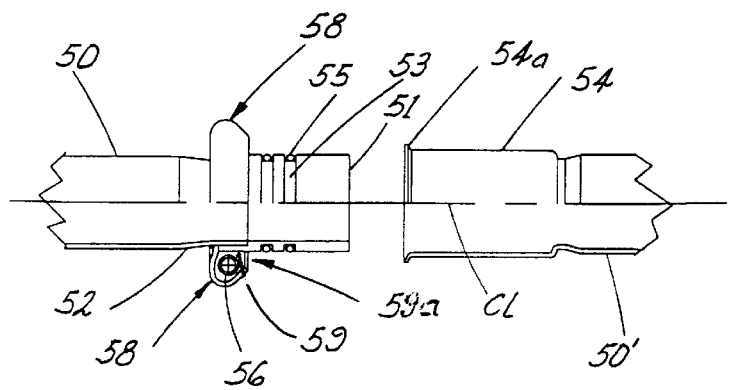
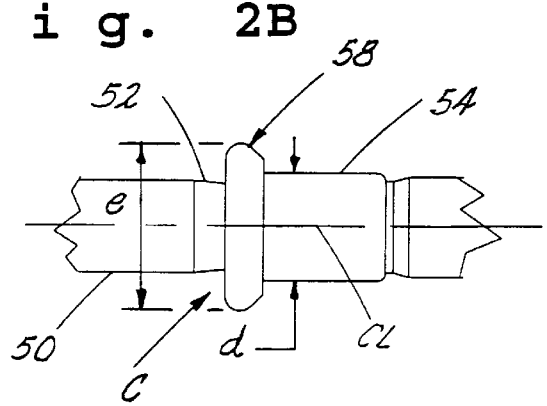
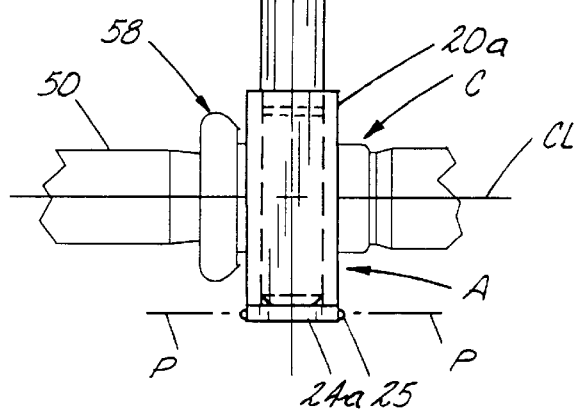

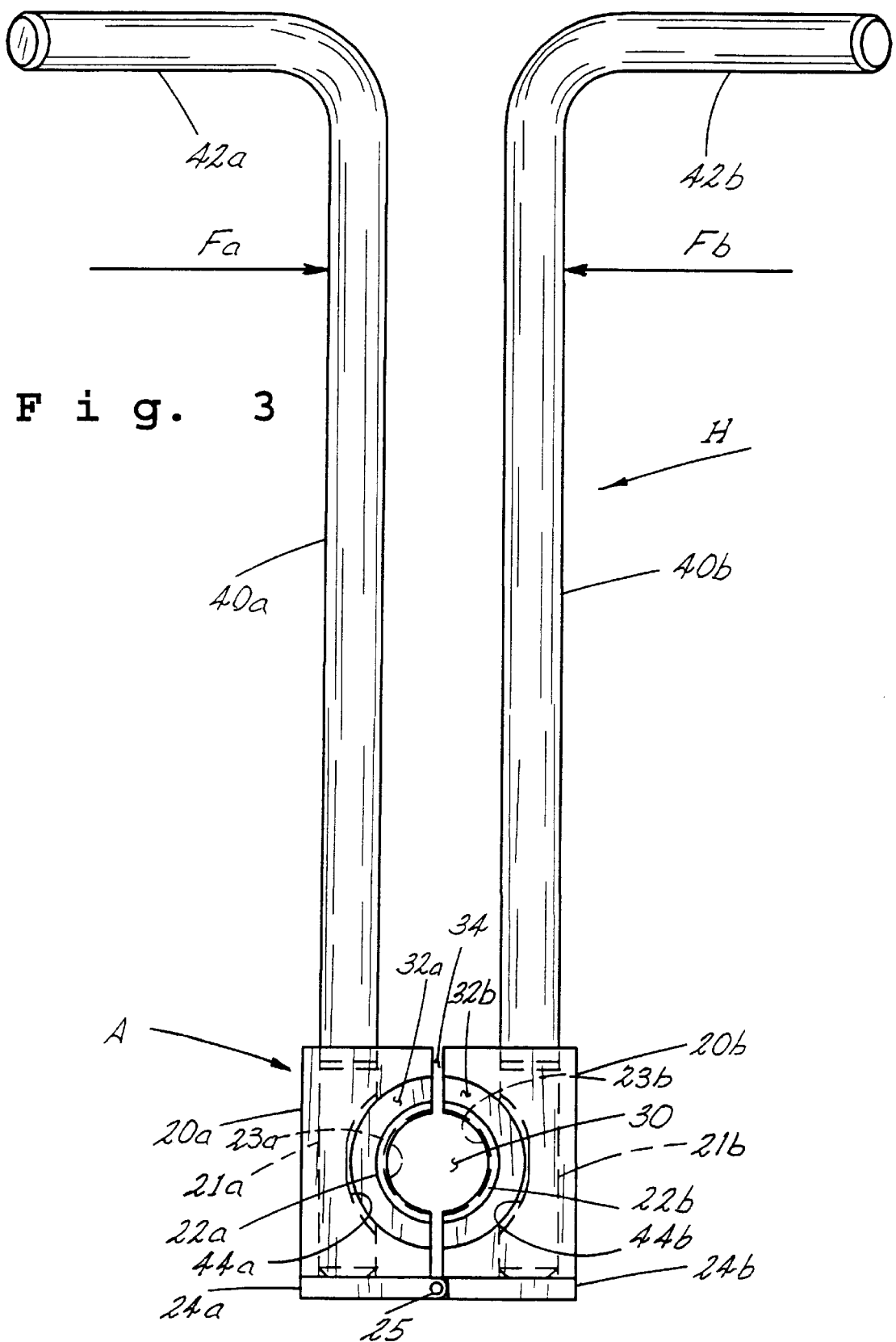

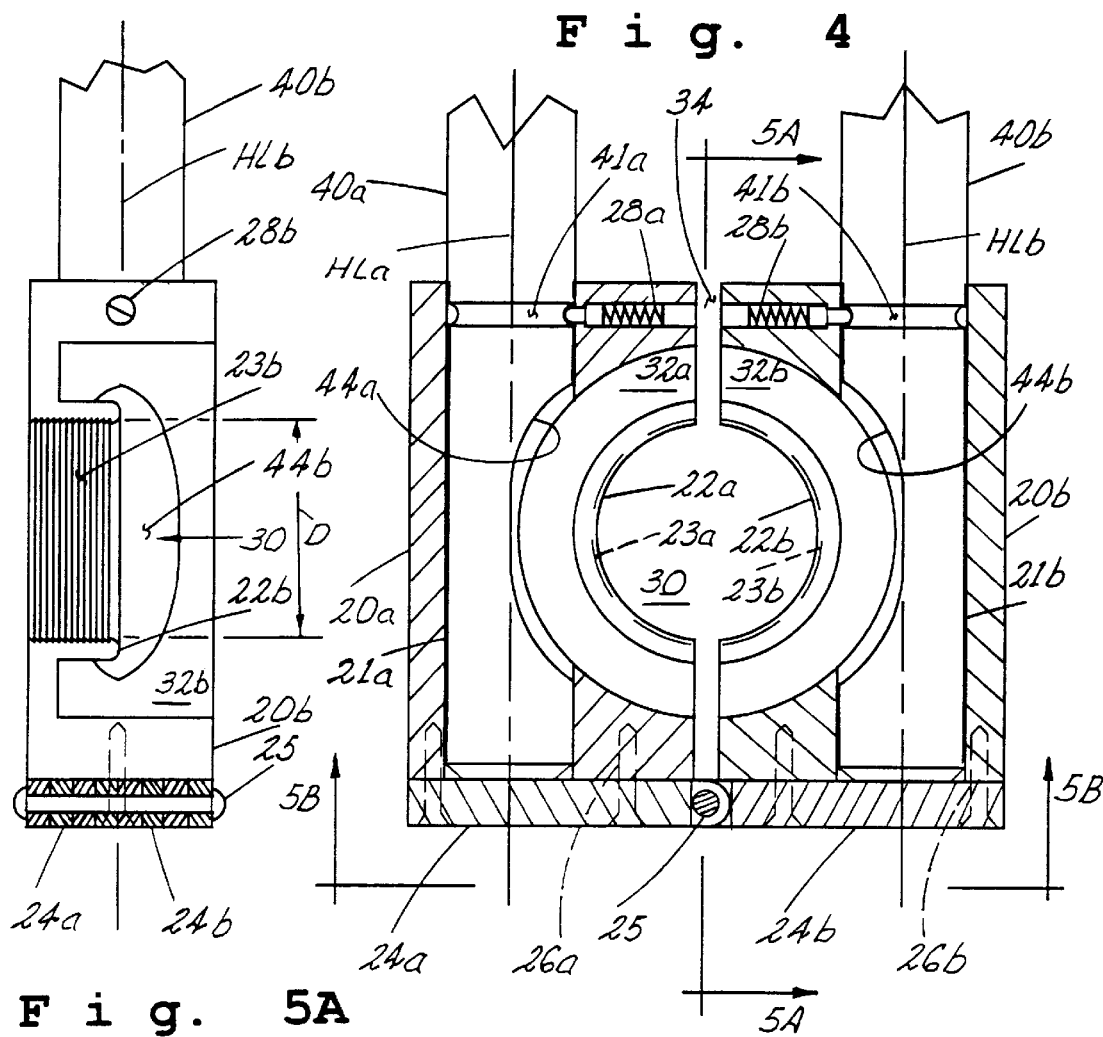
Fig. 4
Fig. 5A
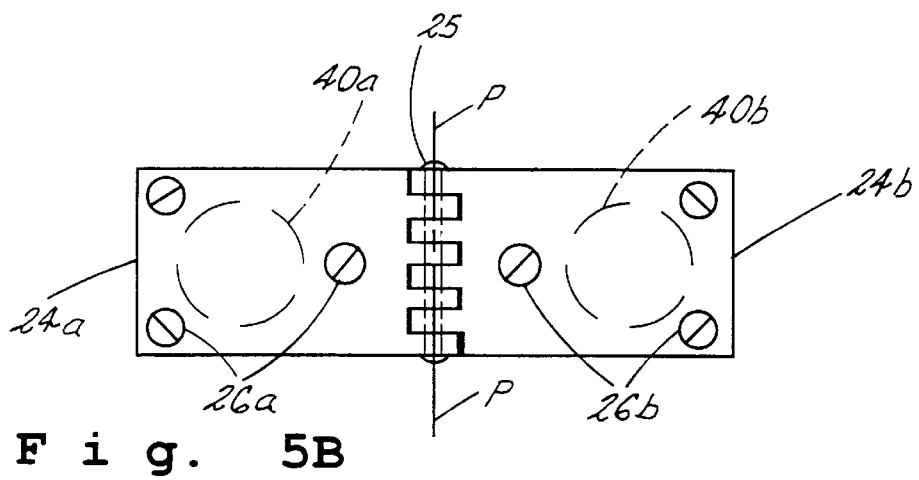
Fig. 5B

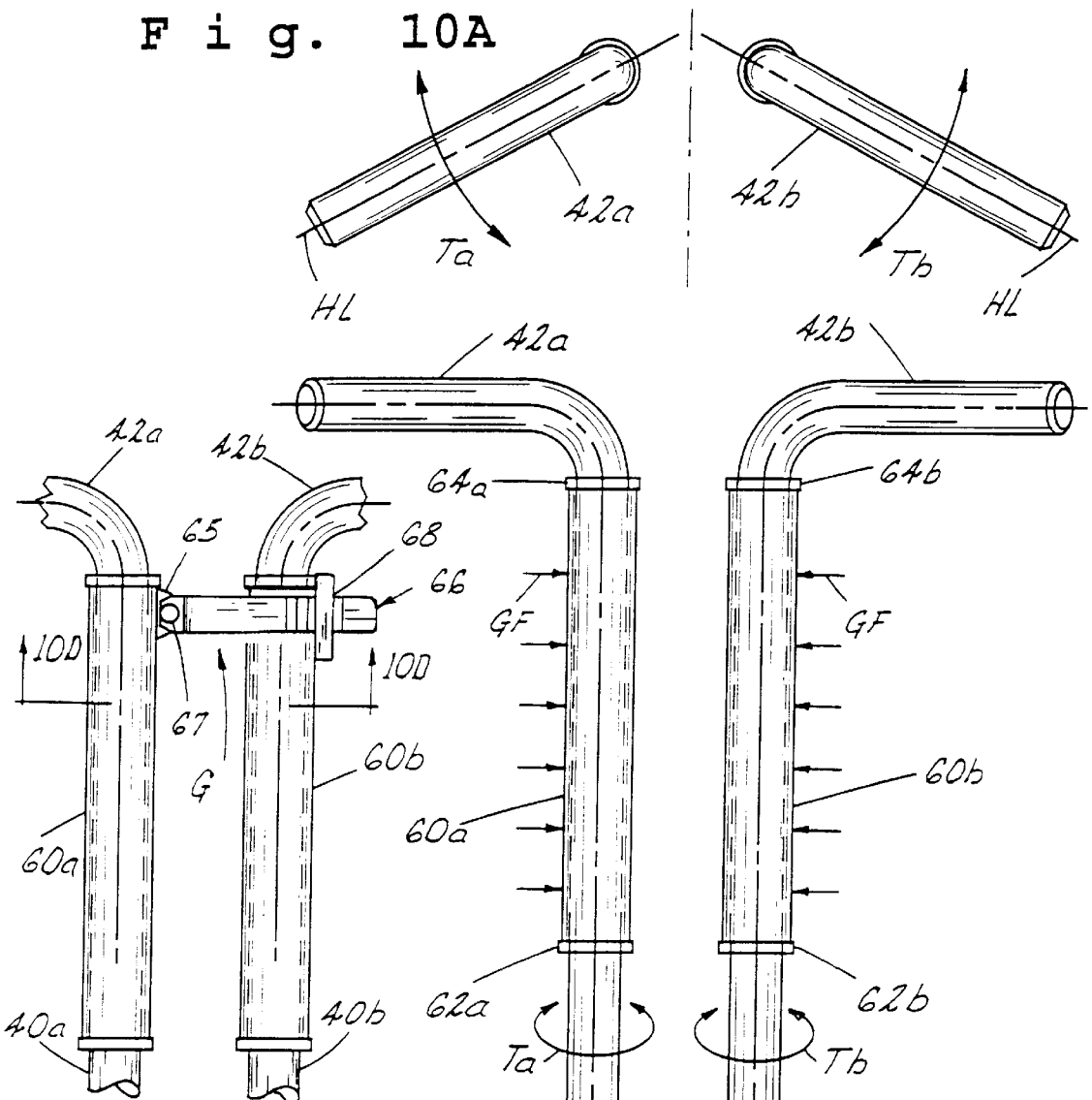
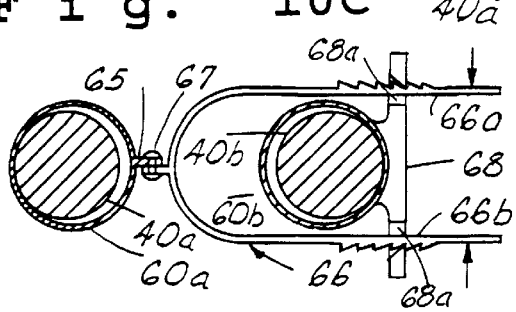

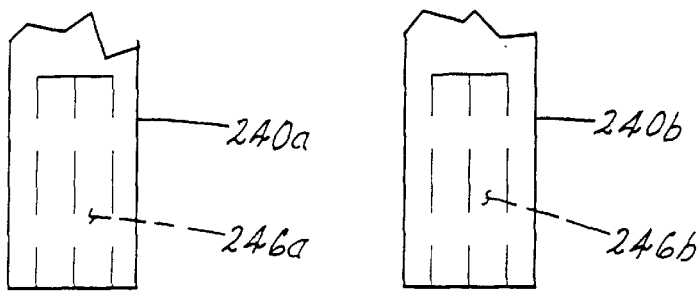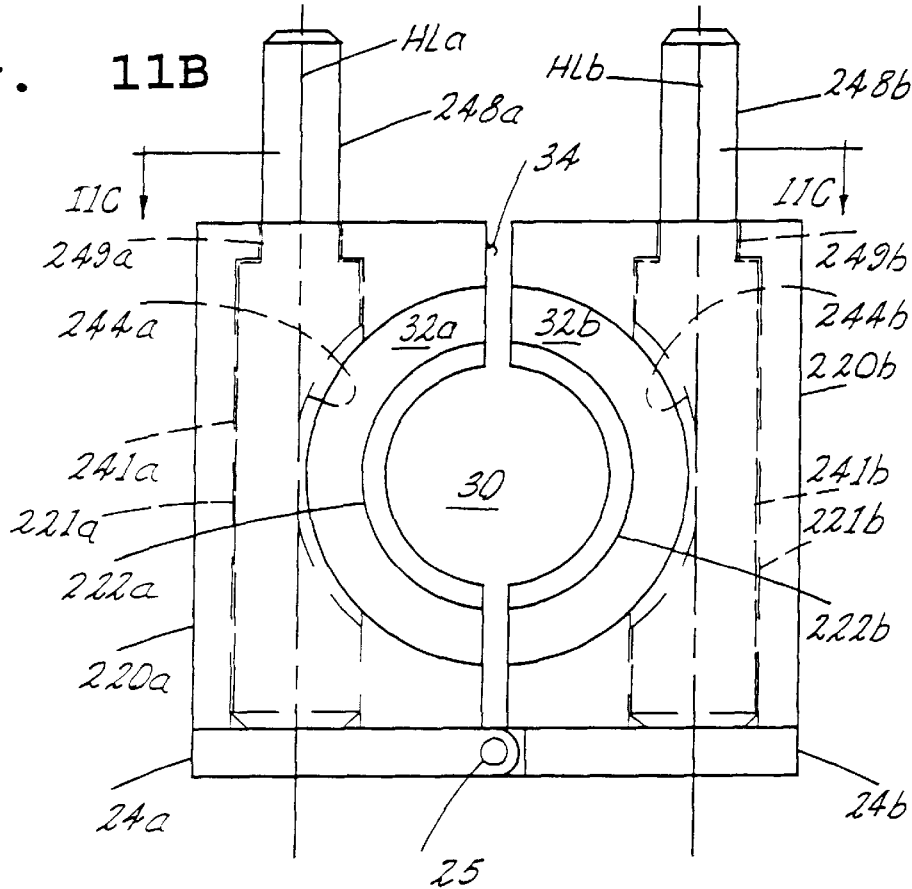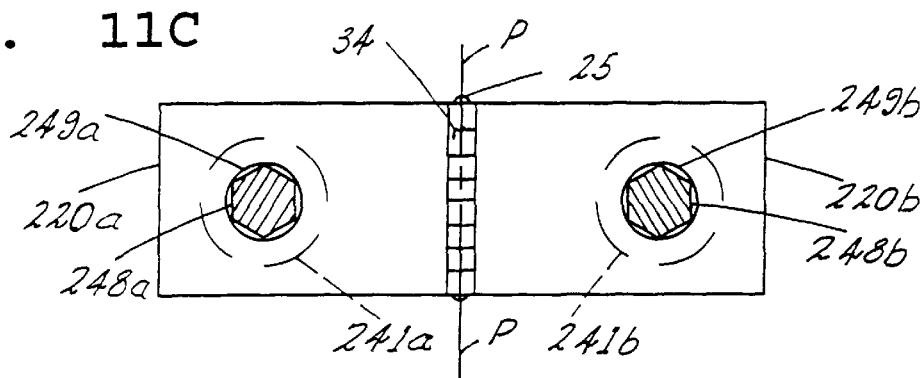

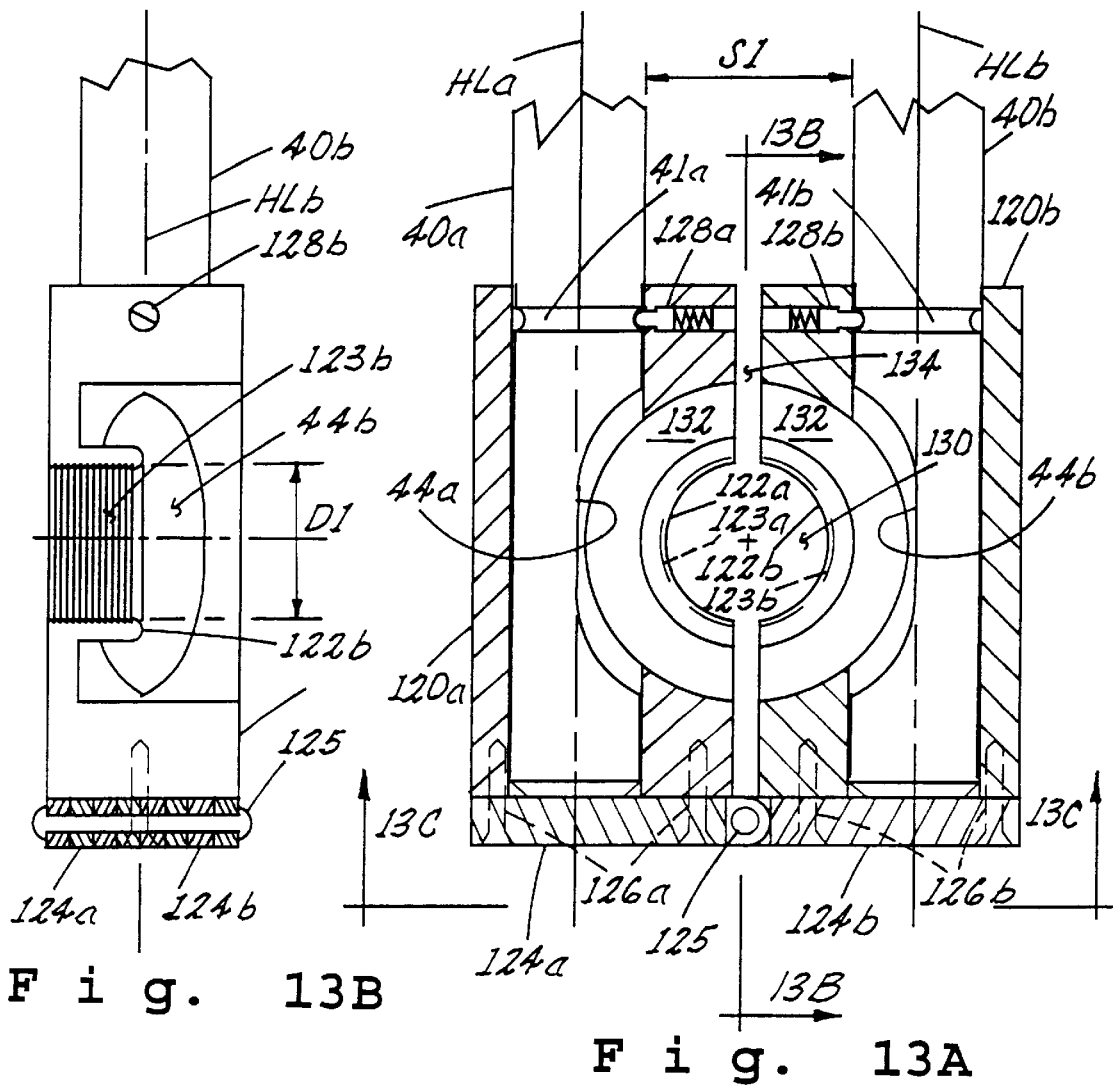
Fig. 13B
Fig. 13A
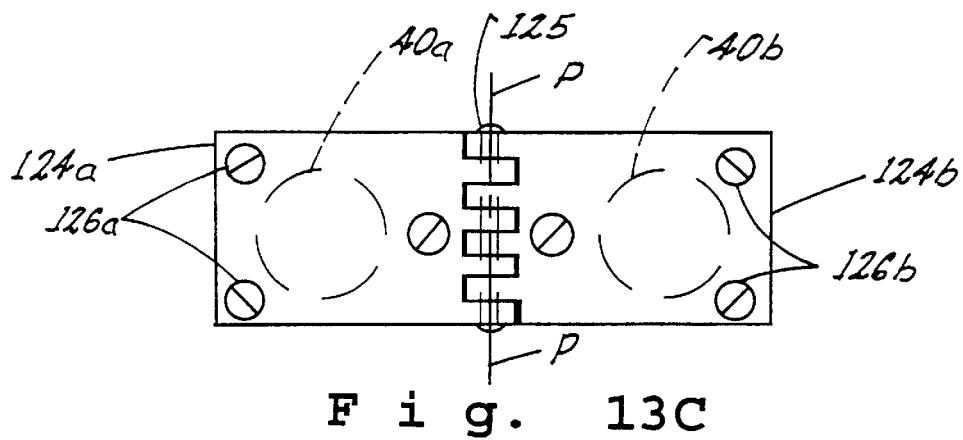
Fig. 13C

DISCONNECT TOOL FOR A SPRING-LOCK® CONNECTOR

BACKGROUND OF THE INVENTION

1. Field of the Invention

This invention is directed to couplings for joining tubes, conduit and pipe that transport fluids, and more particularly to the tools to disconnect quick type couplings that lock with a circular spring.

2. Description of the Art

A class of quick couplings for tubes, conduit and pipe that permit a fluid-tight connection by hand in a short time are typical of those described in U.S. Pat. Nos. 3,711,125: 4,055,359, 4,401,326; 4,632,434; 5,094,494; and 5,529,348. The coupling of patent '359 by McWethy filed in 1975 is typical of this class of quick couplings and has been used in the transportation industry for connecting conduits and tubes of a fluid system carrying pressurized fluids such as air-conditioning fluid, gasoline, hydraulic fluids and the like. This coupling has been widely marketed as Ford's Spring-Lock® fitting. The coupling comprises a pair of fittings with one fitting end portion telescopically disposed within the end portion of the other outer fitting. An annular cage forming an annular chamber is externally mounted on one tube axially spaced from its end. The end of the outer tube is flared outwardly at its free end and extends into the cage through an annular cage aperture. A circular spring is interposed between the flared end and the inside of the cage to prevent axial movement of the tubes and fittings relative to one another when connected. A plurality of "O" rings are compressed between the telescoping ends to seal the connection and prevent leakage.

The patent of McWethy further discloses design criteria established for the coupling device to include "connections must be made by hand although use of a tool for disconnection is permissible". When taking the coupling apart, the circular spring is expanded over the flared end within the chamber of the cage to permit the withdrawal of the outer tube from the cage and subsequently disengagement of the tubes. In the patent of McWethy, the outward displacement of the circular spring is provided by a separate special tool. The tool simply displaces the circular spring in the radial outward direction but does not assist the user in pulling the tube fittings apart. Other tools used in the industry for radially displacing the circular springs are discussed later in this section.

The tubular coupling of patent '326 by Blair includes a snap ring to visually provide a positive indication that a coupling of the McWethy type has been properly connected. The spring lock coupling of patent '494 by McCornnell disclosed a modified cage portion and a double flared means on the end of the second tube fitting to assist in the quick coupling and positive sealing features of Mc Wethy. However, the radial displacement of the circular spring in the cage and pulling the tube fittings apart for disassembly is essentially the same as McWethy.

A quick disassembly is also important when removing vehicular components for maintenance, replacement and/or repair. An initial critical step in the disassembly of a spring-lock coupling is the radial displacement of the circular spring within the cage. The tool disclosed by McWethy is discussed above. Similar tools are available in the industry for this purpose. For example, an air conditioning and/or fuel line disconnect tool set, made by the Lisle Corporation of Clarinda, Iowa 51632 as model number 3700, is disclosed in U.S. Pat. No. 5,455,995. There are six tool sizes to cover the range of spring-lock couplings used by the industry. Other examples include the tool manufactured for AmPro tools Corporation of Los Angeles, Calif. 90015 as model number T70046 and the tool set manufactured for OEM Company Mineola, N.Y. as model number 25052.

The couplings of McWethy used in vehicle air conditioning systems have been marked with acute vehicle industry service problems. Generally speaking, when a connector has been in service for an extended length of time the "O" rings become dry and rigid and the fitting parts become corroded due to the nature of the air conditioning fluid at the interface between fittings. To help solve these problems U.S. Pat. No. 4,728,130; U.S. Pat. No. Re. 33,946; and U.S. Pat. No. 5,480,193 disclose a split clamp to fit snugly over the cage of the coupling to secure the cage and prevent loss of fluid from the fittings. The clamps, however, add rigidity to the connection and do not permit movement between connected parts that are desirable for absorbing vehicular vibrations. The clamps must also be removed before the tubes can be disconnected.

The industry continues to use the same general construction of the McWethy coupling which inherently demands a relatively high level of manual forces to achieve a quick connection and particularly to achieve a quick disassembly. This is the result of the dry O-rings and corrosion which results is an initial locking effect that requires a high axial load to break the fittings apart so they can be displaced axially with respect to one another. The combination tool disclosed by Scarborough in U.S. Pat. No. 5,671,520 not only radially displaces the circular spring in the cage but also forces the fittings to be axially displaced with respect to one another to break the coupling apart. The tool has three long handles to provide a mechanical advantage in breaking the locking effect. This advantage is somewhat limited with the tool of Scarborough. A problem continues to exist in operating three handles with two hands and tightly locked joints are difficult to beak loose Accordingly, an object of the present invention is to provide a hand held tool to disconnect a tubular conduit having quick-connect type fittings with a circular spring by both displacing the spring and breaking apart the fittings.

Another object of the present invention is to provide a low cost disconnect tool having interchangeable parts that allow the tool to be adapted to the different sizes of tubular conduits or pipes.

Yet another object of the present invention is to provide a hand held tool that can disconnect quick-connect type fittings of tubular conduit or pipe with relatively little effort in a relatively short period of time.

Still another object of the present invention is provide an assembly for connecting and disconnecting a tubular conduit or pipe using quick-connect fittings with a circular spring for connecting together the two ends of the conduit or pipe and a disconnect tool for taking the fittings apart.

SUMMARY OF THE INVENTION

The above objectives are accomplished according to the present invention by providing a disconnect tool with a pair of fixtures having a central tool aperture or bore. The fixtures of the tool are placed around a second fitting of a spring-lock® type coupling of a tubular conduit or pipe to be disconnected along a tubular axis of the conduit. The fixtures also provide annular cage recesses to receive a cage portion of a first fitting of the coupling. Extending between the center tool aperture and the cage recesses of the fixtures is a pair of annular projecting collars. A pair of handles each have a lever arm and a shaft. The shaft is rotationally retained in a cylindrical bore of a respective fixture. The shafts of the handles each have a cutout forming a prying surface exposed to the cage bore within the respective fixture. In a first operating mode the fixtures are displaced along the tubular axis so that the collars inter the cage of the coupling and contact a circular locking spring within a chamber of the cage. In a second operating mode the lever arms are rotated in one direction so that prying surfaces of the shafts contact one outer side of the cage and the collars are pulled further into the cage to displace the circular locking spring within the chamber of the cage. In a third operating mode the handles are forced together to grip the second fitting of the connector. While maintaining the grip, the lever arms are rotated in an opposite direction so that prying surfaces of the shafts contact the other outer side of the cage and move the first and second fittings apart relative to one another along the tubular axis so the coupling can be disconnected.

Describing in more detail an embodiment of this invention, a disconnect tool is provided for a tubular conduit coupling or connector having first and second fittings. The fittings are connected together along a tubular axis using a circular spring in a cage of the first fitting to contact a flared end of the second fitting. The tool comprises first and second fixtures being one connected with the other to provide a center tool aperture to receive the second fitting of the coupling. An annular projecting collar is formed in each fixture to define a cage recess radially to the outside of the collars from the tubular axis. The collars are disposed to the outside of the second fitting so that the collars are free to slide axially along the second fitting, enter the cage opening and make contact with the circular spring. First and second handles each having a shaft, a lever arm extending from one end of the shaft and a prying surface formed near the other end of the shaft. Each one of the fixtures has a cylindrical bore to receive a respective shaft of the handle so that the prying surfaces of the shafts are exposed to the cage recesses of the fixtures when the shafts are in an operational position within the fixtures. Therefore, the prying surfaces are positioned on each lateral side of the cage for contacting the cage by turning the lever arms relative to the tubular axis from a first non-contacting position to other positions for displacing the circular spring and moving the fittings axially with respect to one another so that the coupling can be unlocked and disconnected.

In a combination embodiment, the invention is an assembly for connecting and disconnecting ends of a tubular conduit along a tubular axis. The assembly comprises a first cylindrical fitting affixed to one of the ends of the conduit. The first fitting has an exterior cage forming a chamber with an annular cage aperature. A second cylindrical fitting is affixed to the other one of the ends of the conduit. The second fitting has a flared end facing the first fitting so that the flared end of the second fitting is forced into the annular cage aperature when the first and second fittings are telescopically disposed together. A circular spring is adapted for resilient retention of the flared end within the cage. Therefore, the tubular conduit is connected along the tubular conduit axis. First and second fixtures, being one hinged together with the other, provide a center tool aperture to receive the second fitting. An annular projecting collar formed in each fixture is disposed to the outside of the second fitting so that the collars are free to slide axially along the second fitting, enter the cage aperature and arrive at a location wherein both collars make contact with the circular spring. First and second handles are provided with each having a shaft, a lever arm extending from one end of the shaft and a prying surface formed near the other end of the shaft. Each one of the fixtures has a vertical bore to receive a respective shaft of the handles so that the prying surfaces of the shafts are exposed to the cage recesses of the fixtures with the lever arms in a first position. The prying surfaces are located on each lateral side of the cage for contacting the cage when the lever arms of the handles are turned within the bores of the fixtures from the first position. Therefore, the coupling can be disconnected and the tubular conduit can be separated along the tubular axis.

In another embodiment of the invention, a method for disconnecting a quick-connect type coupling of a tubular conduit along a tubular axis is provided. The coupling is characterized by first and second fittings including a cage of the first fitting with an annular cage aperture, a flared end of the second fitting and a circular spring. The circular spring is adapted for resilient retention of the flared end within a chamber of the cage for connecting first and second fittings of the coupling together. The method including the first step of providing first and second fixtures of a size corresponding to the size of the tubular coupling. The fixtures each having a side cutout, a cylindrical bore and an annular projecting collar forming a partial cage recess. The second step includes hinging the fixtures together so that the side cutouts form a center tool aperture, the partial cage recesses form an annular cage recess and the collars are placed around the second fitting. The third step includes providing a pair of handles, each with a shaft having a lever arm at one end and a prying surface formed near the other end of the shaft. The fourth step includes placing each handle shaft in a respective cylindrical bore of a respective fixture so that the prying surface is exposed to a respective partial cage recess. The handles being free to rotate within the bores. In a fifth step the method includes displacing the hinged together fixtures axially along the second fitting so that the collars are forced through the annular cage aperture of the first fitting and contact the circular spring within a chamber of the cage when the lever arms of the handles are in a first position. A sixth step includes rotating the handles so that the lever arms are in a second position and the prying surfaces contact one axial side of the cage of the first fitting and the collars radially displace the circular spring within the cage. A seventh step includes forcing the shafts of the pair of handles to move toward one another for gripping and holding the second fitting with the collars. A last step includes rotating the handles to place the lever arms in a third position so that the prying surfaces contact the cage of the first fitting on an opposite axial side and move the first and second fittings of the coupling axially apart with respect to one another along the tubular axis so that the coupling can be disconnected.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 2 is a side elevation view of the tool of this invention positioned around a tubular conduit of FIG. 1;

FIG. 2A & 2B are plan views of the fitting in a first position (FIG. 2A) where the ends of the tubular conduits each have a fitting with the two fittings aligned with one another, and a second position (FIG. 2B) were the conduits have been joined by the fittings being telescopically disposed together to form a tubular conduit coupling.

FIG. 3 is a front elevation view of the tool of this invention including a pair of handles each with a fixture at one end, wherein the fixtures are hinged together to be placed around the fittings of the tubular conduit coupling;

FIG. 4 is a sectional view of the hinged together first and second fixtures having a center tool aperture and a cage recess to receive the fittings of the coupling.

FIGS. 5A & 5B are side elevation and bottom views of the first and second fixtures taken along line 5A—5A (FIG. 5A) and along line 5B—5B (FIG. 5B) respectively of FIG. 4;

FIGS. 10A, 10B, 10C & 10D are top, elevation and sectional views showing the pair of handles of FIG. 8 with each handle having a hand grip sleeve that allows the handles to be rotated while forcing the handles together (FIGS. 10A, 10B & 10C), and showing a latch mechanism to hold the handles together (FIGS. 10C & 10D);

FIGS. 11A, 11B & 11C are elevation and bottom views of the fixtures and handles of another embodiment of the tool of this invention, wherein each shaft of the handles is made in two parts with a lower shaft portion carried by the first and second fixtures of the tool and a shaft extension for connecting to an upper shaft portion;

FIG. 13A, 13B & 13C include a sectional view, a side elevation and a bottom view of another aspect of the invention showing the use of the same handles as those of FIG. 4 with similar first and second fixtures for disconnecting a coupling of a smaller size than that of FIG. 4.

DESCRIPTION OF A PREFERRED EMBODIMENT

Figure 1:
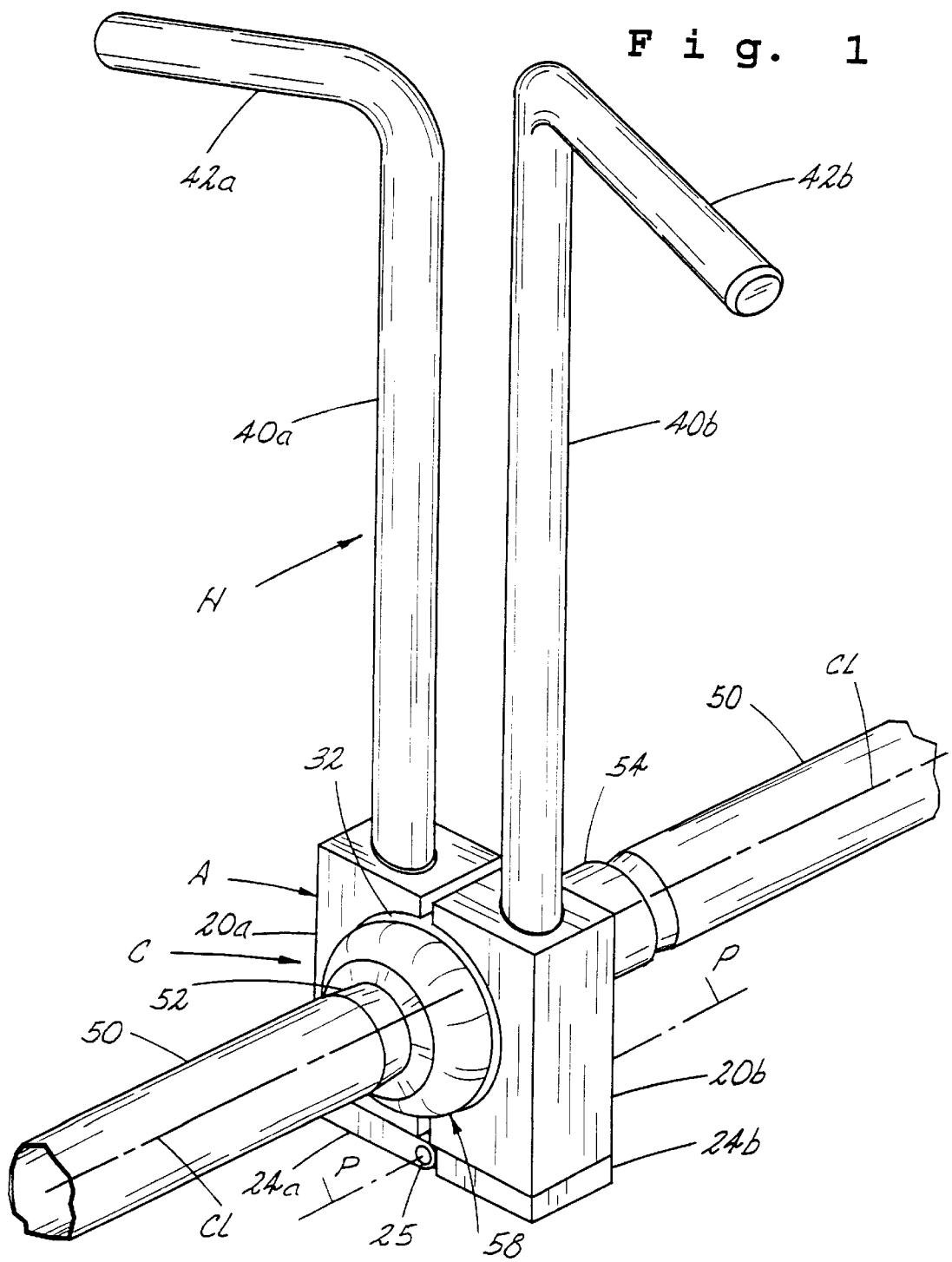
FIG. 1 is a perspective view of the disconnect tool of this invention positioned around a tubular conduit having a spring-lock® connector coupling, wherein the tool is in a position for decoupling the two fittings of the coupling.

Referring now in more detail to the drawings, the invention will now be described in more detail. In the embodiment illustrated in FIG. 1, the disconnect tool of this invention has a pair of fixtures A placed around a tubular conduit coupling C used to connect a tubular pipe or conduit 50 together. The coupling has a first fitting 52 with a cup shaped cage 58 and a second fitting 54 used to connect the two ends of the tubular conduit. The pair of fixtures include a first fixture 20a and a corresponding second fixture 20b which are connected together with a hinge pivot pin 25 so that the fixtures can be rotated apart about a pivotal axis P and positioned on both sides of the second fitting 54. A first hinge part 24a is attached to first fixture 20a and a second hinge part 24b is attached to second fixture 20b. A pair of handles H each have a shaft 40a, 40b that extend from the fixture 20a, 20b for moving the fixtures parallel to a conduit centerline CL along second fixture 54 so that cage 58 is placed in cage recesses 32a and 32b of the fixtures. The pair of handles have lever arms 42a and 42b extending from one end of shafts 40a and 40b respectively. By rotating the lever arms to turn the shafts inside the fixtures, the fittings 52 and 54 can be unlocked and moved along the conduit centerline with respect to one another. The result being the tubular conduit can be disconnected at the fittings by the disconnect tool of this invention without damage to the fittings or the tubular conduit. Various sizes of fixtures can be made to correspond with the different sizes of couplings. Further details of the disconnect tool are discussed in the following sections.

A side view of the pair of fixtures A of the disconnect tool placed around coupling C is illustrated in FIG. 2. A fixture 20a is attached to a hinge 24a which allows the fixture to rotate about pivotal axis P—P in a plane perpendicular to tubular axis or centerline CL of the tubular conduit 50. The initial position of cage 58 of the coupling is axially displaced from fixture 20a. A shaft 40a of the handles extends from the fixture with a lever arm 42a of the handles at the remote outer end of the shaft from the fixture. The disconnect tool of FIG. 2 is shown in an initial position place around the coupling and is further displaced and the handles operated to assist in disconnecting the coupling.

An integral part of this invention is the use of Spring-Locke connecting fittings for connecting together the ends of a tubular pipe or conduit. This connector or coupling is of the type of connectors commonly known as "quick-connect tubular couplings". To better explain how the disconnect tool works with the coupling, a discussion of the details of the coupling is set forth by referring to FIGS. 2A and 2B. The tubular conduit 50 to be connected has a first cylindrical fitting 52 affixed to one tubular end and a second cylindrical fitting 54 affixed to the other tubular end (FIG. 2A). The first fitting includes a cage 58, with an exterior diameter "e", forming a chamber 59 with an annular cage aperture 59a. The second fitting includes a flared end 54a positioned to face the annular cage aperture and an exterior diameter "d" large enough to telescopically fit the second fitting over the end 51 of the first fitting. A circular spring 56 is placed in chamber 59 and is adapted for resilient retention of the flared end of the second fitting within the cage when the fittings are forced together (FIG. 2B). In addition, end 51 of the first fitting contains annular cutouts 53 each to receive an O-ring 55 placed in the cutout. The O-rings provide a seal and allow the tubular pipe or conduit to be pressurized when connected and placed in service to transport a fluid under pressure. The assembly and disassembly of the coupling is described in U.S. Pat. No. 4,055,359, the entire disclosure of which is incorporated herein by reference. Other similar connectors or couplings having the locking means of a circular spring can be used with the disconnect tool of this invention. The combination of the coupling and the disconnect tool provides an assembly for connecting and disconnecting ends of a tubular conduit along a tubular axis according to the present invention.

Referring to FIG. 3, the disconnect tool of this invention is discussed in more detail. This illustration is a front elevation view of the tool with the tubular conduit and coupling removed for clarity. A horizontally extending tubular conduit is assumed for the discussions to follow. The tool is shown in a position with handles H positioned vertically above the pair of fixtures A. Other positions of the disconnect tool are also possible provided the pair of fixtures is generally perpendicular with a tubular axis of the conduit (not. shown). First and second fixtures 20a and 20b each have side cutouts to form a center tool aperture 30. Fixtures 20a and 20b each have a annular projecting collar 22a, 22b forming a partial cage recess 32a, 32b. The partial cage recesses form a complete annular cage recess to receive the cage of the coupling. The pair of fixtures are carried by first and second hinges 24a and 24b connected by a hinge pin 25. A gap 34 between the fixtures allows center tool aperture 30 to be adjusted for gripping the second fitting of the coupling on the radial inside of collars 22a and 22b respectively. The fixtures each have a cylindrical bore 21a, 21b to receive a respective shaft 40a, 40b of the pair of handles H. The handle shafts each have a prying surface 44a, 44b which become exposed to the cage aperture. Rotation of the lever arms 42a and 42b of the handles moves the prying surfaces into the cage opening to make contact with the cage of the coupling (not shown). Forces Fa and Fb on the handles provide the force necessary for gripping the coupling when the coupling is placed in center tool aperture 30.

Further details of the first and second fittings 20a and 20b are illustrated in the sectional view of FIG. 4. In addition, a view along line 5A—5A of FIG. 4 is illustrated in FIG. 5A and a bottom view along line 5B—5B of FIG. 4 is illustrated in FIG. 5B. First and second hinge parts 24a and 24b are affixed to the fittings using fasteners 26a and 26b. Pivot pin 25 attaches the hinge parts together so the fixtures can rotate with respect to one another about pivotal axis P—P. The fittings each have a cylindrical bore 21a, 21b to receive a shaft 40a, 40b of a respective handle so that the shaft can freely turn within the bore. The removable shafts are held in place by retainer elements 28a and 28b which engage retainer cutouts 41a and 41b in the shafts 40a and 40b respectively. The shafts can be forced into their proper position in the cylindrical bores and removed from the bores by pulling the shafts from the cylindrical bores by hand. Similar commercially available retainer elements can be used within the scope of this invention. Prying surfaces 44a and 44b formed in the shafts of the handles are exposed to the partial cage recesses 32a and 32b of the fixtures. Collars 22a and 22b are positioned between the center tool aperture 30 and the cage recesses. The annular shaped collars have radial innermost surfaces which are made to have gripping surfaces 23a and 23b by forming a series of sharp ridges along the gripping surfaces (i.e. like those of a pair of pliers). The center tool aperture has a diameter "D" to correspond with the outer diameter "d" of the second fitting of the coupling (FIG. 2B). Closing the center gap 34 by rotating the fixtures about the pivot pin, by forcing the shafts of the handles to approach one another, helps to increase the gripping action of the fixtures on the second fitting of the coupling.

Figure 6A:
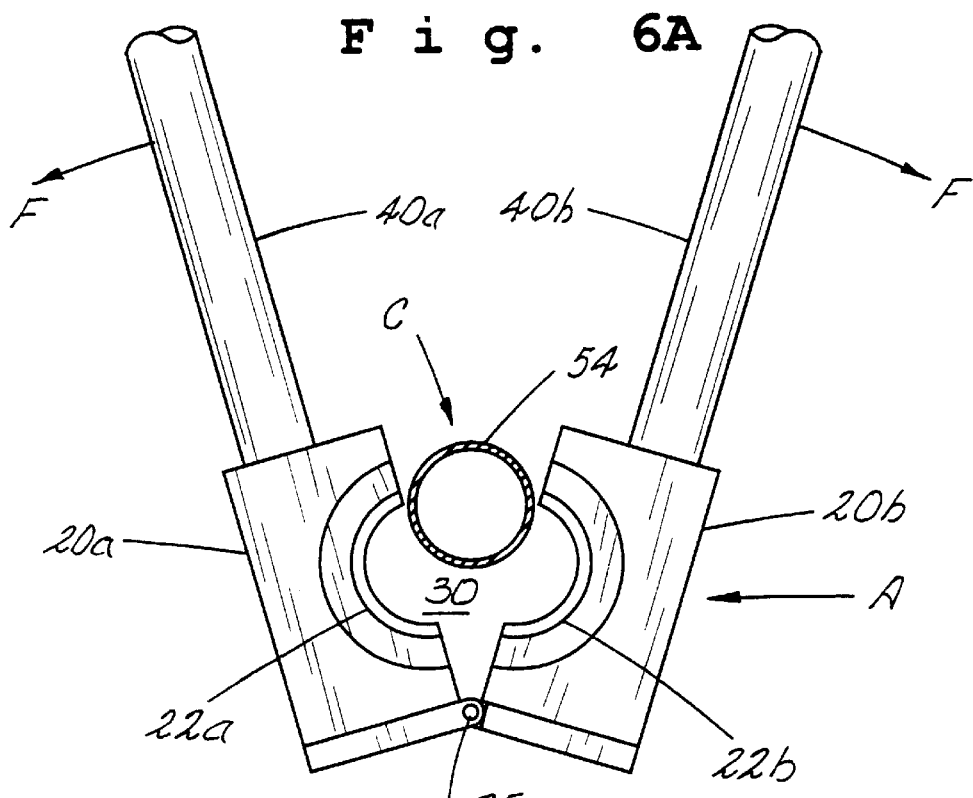
FIG. 6A & 6B are partial front elevation views of the disconnect tool showing the first and second fixtures of the tool being rotated about a pivot pin (FIG. 6A) so that the tool can be placed around the second fitting of the coupling (FIG. 6B)
Figure 6B:
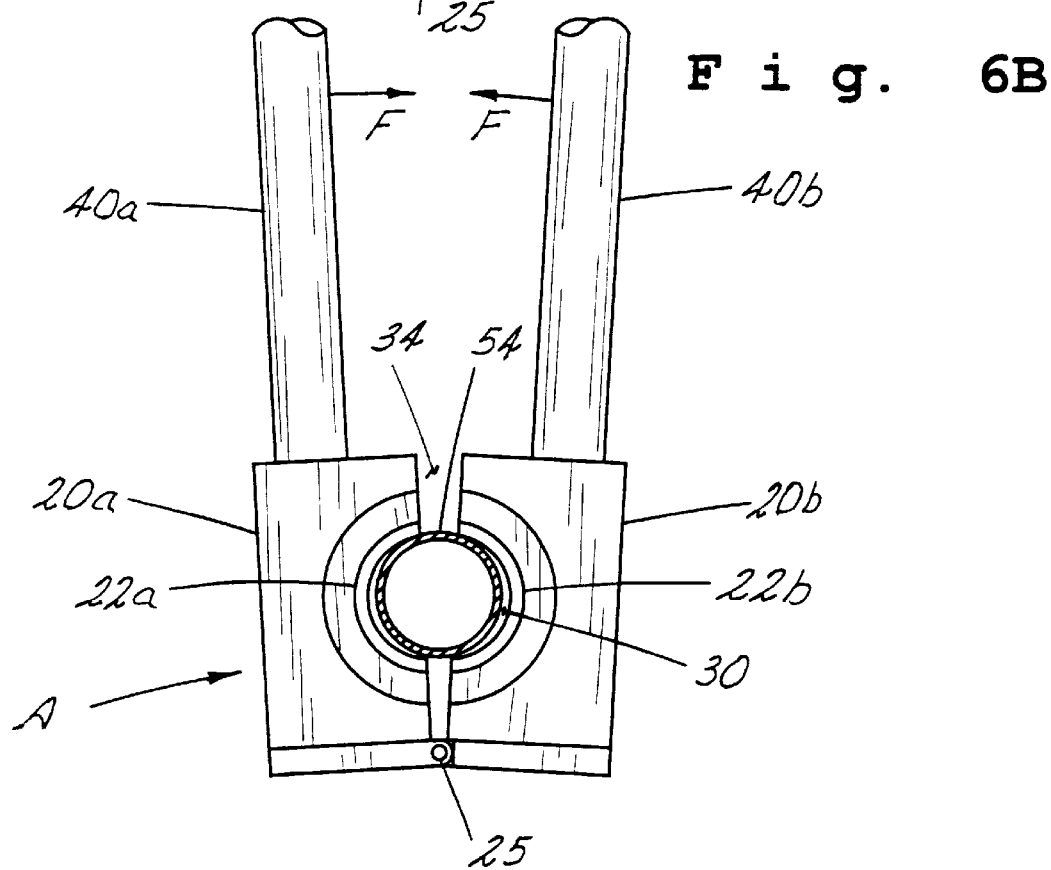

The step of placing the disconnect tool around the tubular conduit pipe coupling C is illustrated in FIGS. 6A and 6B. The handles move apart by applying an outward force F to shafts 40a and 40b to rotate fixtures 20a and 20b and provide a space between collars 22a and 22b for the coupling to enter the tool aperture 30. Once the coupling is aligned with tool center aperture 30 the forces are reversed to close the fixtures around the coupling so that collars 22a and 22b fit around the coupling as gap 34 is decreased.

Figure 7:
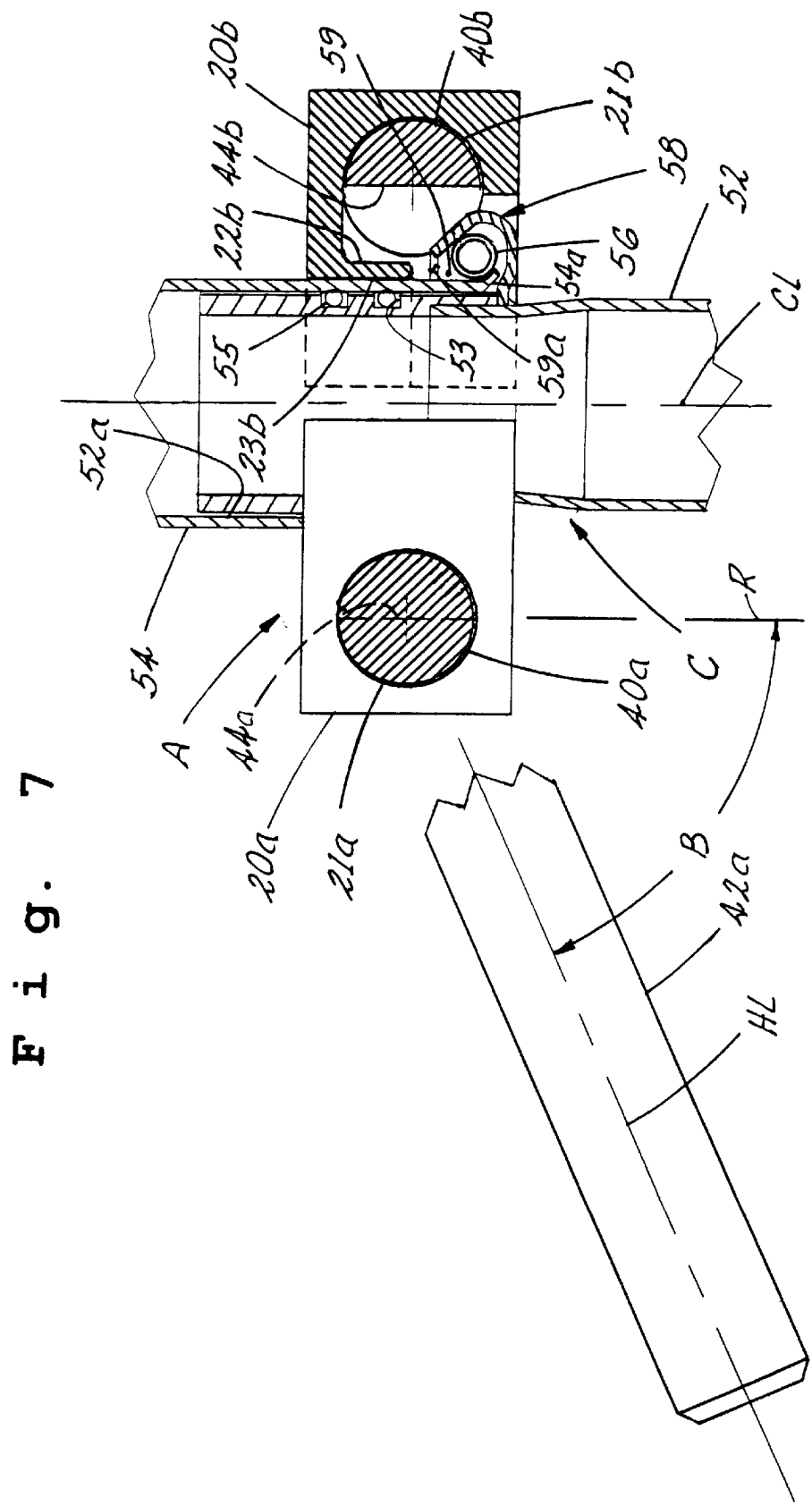
FIG. 7 is a top view with partial sectional view of the coupling, the first handle and the second fixture showing the tool in a position for partial annular collars of the first and second fixtures to contact a circular spring in a cage of the first fitting.

Having generally described the disconnect tool and coupling C and placed fixtures A around coupling C, the structural and functional or operational features of the disconnect tool as it relates to the decoupling process are discussed in detail in the following sections. First and second fittings 52 and 54 of the coupling are connected together at an interface 54a, as illustrated in the plan view with partial cross-sections of FIG. 7. Certain components are shown in cross-section by passing a horizontal plane through tubular axis CL. These components include the second fixture 20b, the second shaft 40a of the handles and coupling C. First shaft 40a of the handles and the corresponding lever arm 42a are cut above first fixture 20a. Circular spring 56 is holding the second fitting connected with the first fitting in cage chamber 59 of cage 58. The second fixture 20b is shown in a position so that collar 22b is to the outside and in contact with second fitting 54 and facing annular cage aperture 59a of cage 58. Gripping surface 23b of the second fixture is in a position to grip and hold fitting 54 when the second fixture is forced against the second fitting during a later operating position of fixtures A. Shafts 40a and 40b of the handles are initially positioned within cylindrical bores 21a and 21b of the fixtures to a first position where a handle centerline HL is at an initial angle "B" from a reference line R parallel to tubular axis CL. The initial or first position of the lever arms determined by angle B, place prying surfaces 44a and 44b in the first position so that surfaces 44a and 44b are parallel to a vertical plane through tubular axis CL. Having described the initial or first position of the disconnect tool with respect to the coupling, the tool can be operated to release the circular spring 56 from locking fittings 52 and 54 together and to disconnect coupling C.

Figure 8A:
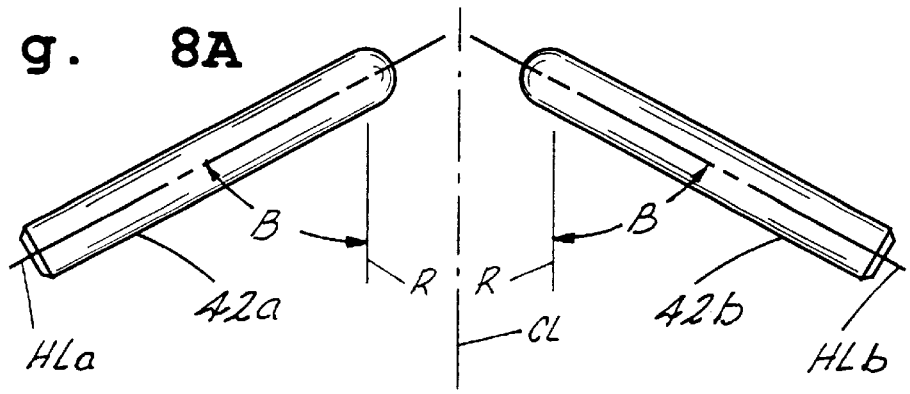
FIGS. 8A & 8B are top and elevation views respectively of the pair of handles of the tool of the invention.
Figure 8B:
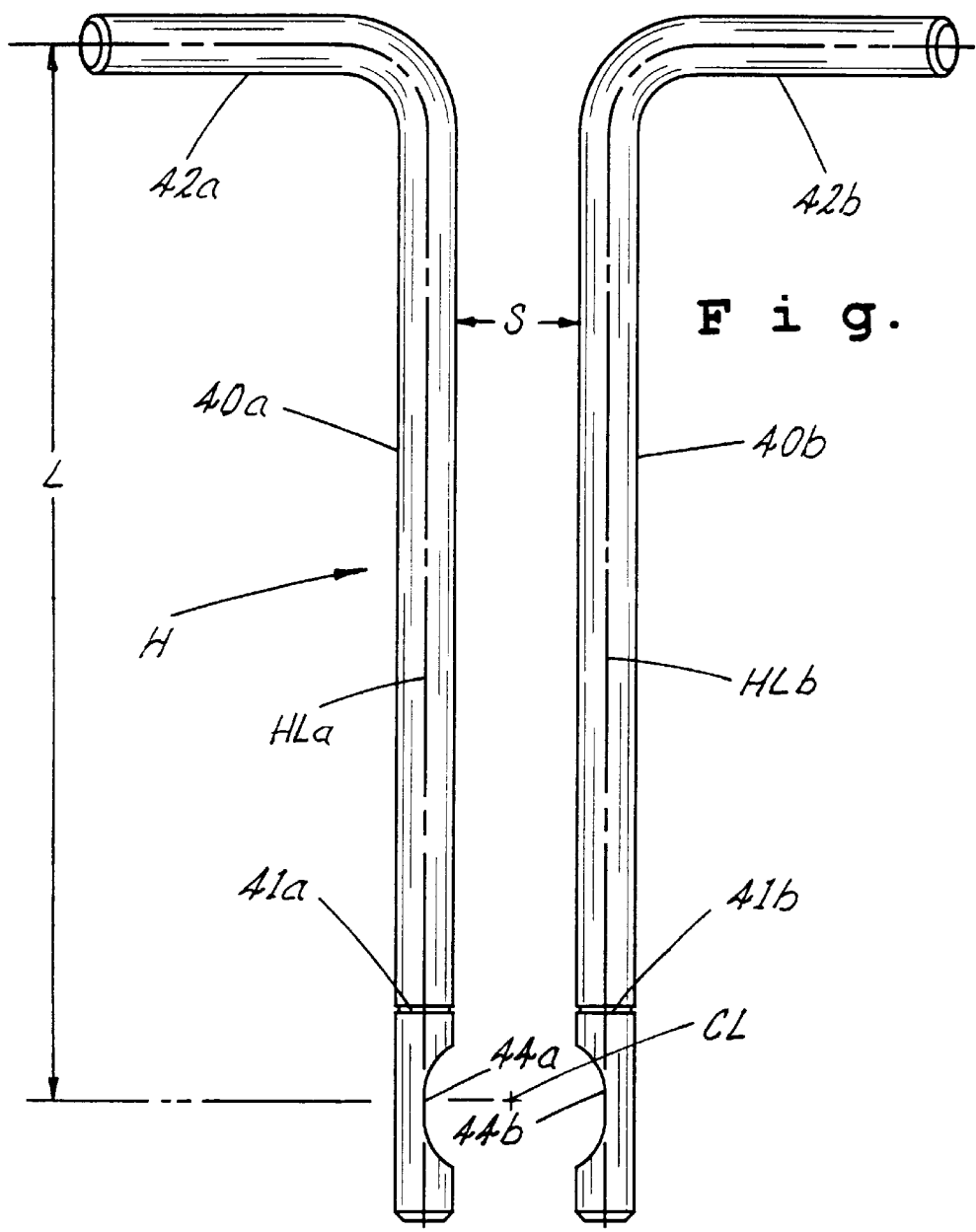

The position of the prying surfaces 44a and 44b relative to the location of the lever arms 42a and 42b of handles H are critical to the operation of the disconnect tool. The prying surfaces are formed by cutouts in the circular shafts 40a and 40b and extend to the center of the shafts. The illustrations of FIGS. 8A and 8B show a top view and a front view respectively of the disconnect tool of FIG. 3, with the fixtures removed for clarity. For this discussion the handles are again assumed to be vertical. The handles are spaced apart a distance S to correspond to the lateral spacing of the cylindrical bores of fixtures A. The initial position of both handles is at angle B measured between reference lines R parallel to tubular axis CL and the handle reference lines HLa and HLb. The prying surfaces are both in a plane parallel to a vertical plane containing the tubular axis or centerline CL. Retainer cutouts 41a and 41b in shafts 40a and 40b of the handles provide a means for retaining the handles within the fixtures during the operation of the disconnect tool. Lever arms 42a and 42b are turned from this initial or first position to operate the disconnect tool. The lever arms can also start at different angles from the reference lines with respect to one another within the scope of this invention, however, having the same initial angle is operationally preferred.

The installed disconnect tool is operated by moving the fixtures along the outer surface of the second fitting with the handles in the first rotational position, rotating the handles in one direction to a second rotational position, gripping the second fitting with the fixtures and rotating the handles in an opposite direction to a third rotational position. The three rotational positions of the handles and the corresponding positions of the fixtures relative to the fittings are illustrated in plan views of FIGS. 9A, 9B and 9C respectively. Each illustration shows fixtures 20a and 20b in section, shafts 40a and 40b of the handles in section, the left half of coupling C in section and a top view of an outer end of at least one lever arm 42a and 42b of the handles. The sections are taken by an assumed horizontal plane passing through tubular axis CL.

Figure 9A:
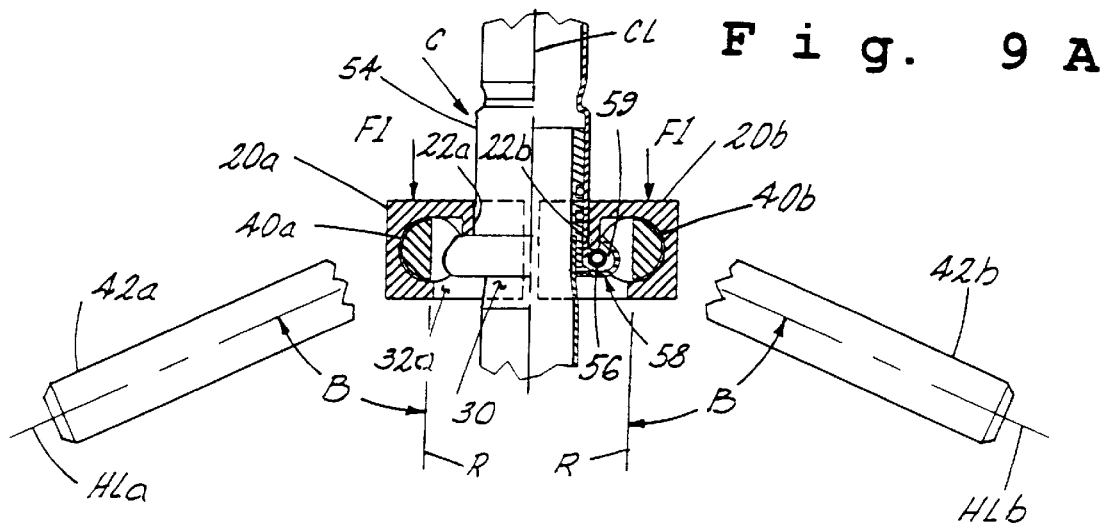
FIGS. 9A, 9B & 9C are top views with partial sectional views of the coupling, the handles and the fixtures showing the disconnect tool in a first position to displace the circular spring (FIG. 9A), in a second position having displaced the circular spring (FIG. 9B) and in a third position having decoupled the two fittings of the coupling (FIG. 9C)

In a first operating mode of the tool, the fixtures are forced to move along the second fitting 54 by applying forces Fl on the fixtures in a direction parallel to the tubular axis CL, as illustrated in FIG. 9A. Collars 22a and 22b are forced into chamber 59 inside cage 58 of the coupling and make contact with circular spring 56. The cage moves into the cage recesses 32a and 32b of the fixtures as the fittings move along the center tool aperture 30. Once again, lever arms 42a and 42b of the handles each have their reference lines Hla, Hlb at an angle B from the reference line R parallel to tubular axis CL. In this position of the lever arms shafts 40a and 40b are maintained in the same initial rotational position as previously defined.

Figure 9B:
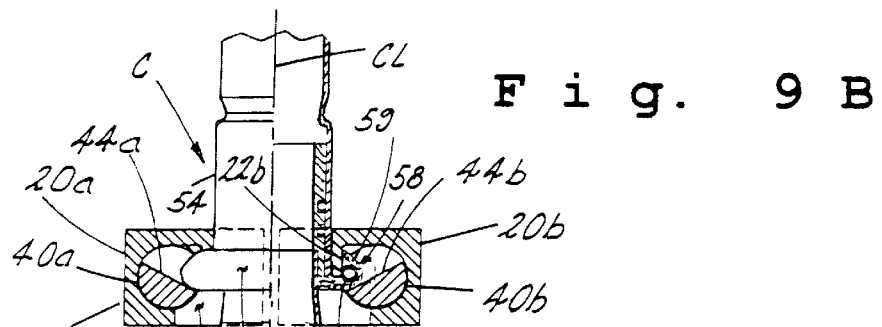

In a second operating mode, a turning force T1 is applied to lever arms 42a and 42b to move the lever arms to approach one another, as illustrated in FIG. 9B. With the rotation of the lever arms, shafts 40a and 40b are rotated in fixtures 20a and 20b and prying surfaces 44a and 44b contact cage 58 of first fitting 52 and pull the cage further into cage recesses 32a and 32b of the fixtures. The relative movement of coupling C with respect to the fixtures forces collars 22a and 22b to displace the circular spring radially outward away from the second fitting within chamber 59 of cage 58. With the handles rotated to a second position, so that handle reference lines HLa and HLb are at an angle B1 from their initial or first rotational position, the circular spring is generally displaced a maximum distance to unlock fittings 52 and 54 from one another. The second position of the handles allows relative axial movement between the two fittings of the coupling.

Figure 9C:
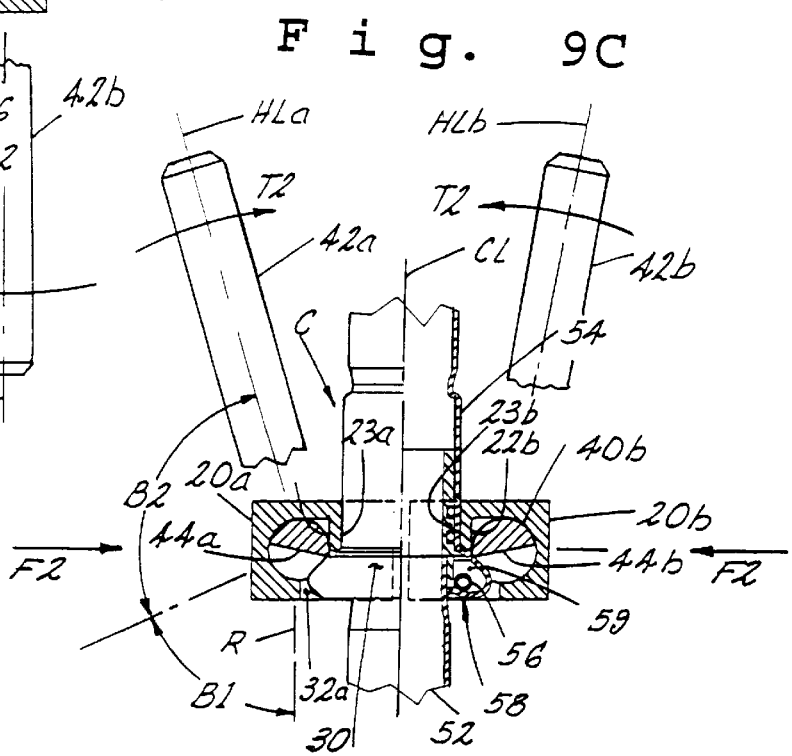

In a third operating mode, a griping force F2 is applied by moving the vertical shafts of the handles to approach one another so that gripping surfaces 23a and 23b grip and hold second fitting 54 of coupling C. With the second fitting held by the gripping surfaces, a turning force T2 opposite to T1 is applied to lever arms 42a and 42b to rotate the lever arms and the shafts 40a and 40b to a third rotational position, as illustrated in FIG. 9C. The shafts again rotate within the fixtures 20a and 20b and prying surfaces 44a and 44b rotate in a direction corresponding to the rotation of the lever arms. The lever arms are rotated back through the first position and the prying surfaces contact an opposite side of cage 58 of first fitting 52 of the coupling. The gripping forces are maintained while turning force T2 is applied to the lever arms. As the lever arms approach a third position so that handle reference lines HLa and HLb are at an angle B2 from the initial or first position, the cage is forced from cage recesses 32a and 32b. Therefore, first and second fittings 52 and 54 of coupling C are displaced with respect to one another along tubular axis CL and the coupling can be disconnected. Circular spring 56 returns to a relaxed position in chamber 59 of cage 58 in a position to receive the flared end of the second fitting when the coupling is reconnected.

Having described the structural components of the disconnect tool of this invention and how it is operated to disconnect a quick connect type coupling with a circular spring type retainer, attention is turned to other embodiments and aspects of the disconnect tool. To assist the operator in holding shafts 40a and 40b of the handles generally parallel with one another while they are rotated, sleeves 60a and 60b are added, as illustrated in FIGS. 10A and 10B. Once again, the fixtures have been removed for clarity in the illustration. The shafts are rotated by turning forces Ta and Tb applied through lever arm 42a and 42b. The sleeves are particularly useful during the third operating mode of the tool, as previously described. The sleeves can be positioned and held in place along shafts 40a and 40b by bottom collars 62a and 62b and top collars 64a and 64b. The sleeves are held by at least one hand, or alternately by another tool, to apply a gripping force GF while the shafts are free to turn within the sleeves. The sleeves can be a simple tubular members each with an inside diameter larger than the outside diameter of a respective shaft. Additional aspects include roller bearings between the shafts and the sleeves or a low friction coating at an interface between the sleeves and the shafts.

To further assist in maintaining gripping forces GF on the handles while the turning forces are applied to the lever arms, an optional aspect of the invention includes a latch mechanism "G" added to the sleeves, as illustrated in FIGS. 10C and 10D. In the partial elevation view of FIG. 9C, latch arms 66 are attached to a first sleeve 60a by a latch pin 67 through a bracket 65 attached to the first sleeve. The latch arms have some ability to move vertically so that latch arms 66a and 66b can be inserted through apertures 68a in a latch keeper 68, as shown in FIG. 10D. Retainer elements on the latch arms engage corresponding keeper elements in the apertures of the latch keeper to maintain the handles in a gripping position without outside assistance. Therefore, the gripping surfaces of the fixtures grip and hold the second fitting of the coupling so that the lever arms can be turned without the need to apply both the gripping forces F2 and turning forces T2 at the same time (FIG. 9C). The latch mechanism is released by forcing the latch arms to approach one another to disengage the retainer elements from the keeper elements, as shown by the arrows.

In another embodiment of the invention, the shafts of the handles are made in two parts, as illustrated in FIGS. 11A, 11 Band 11C. Various structural portions of the fixtures of this embodiment are essentially the same as previously described and illustrated; include annular collars 222a and 222b, center tool aperture 30, partial cage recesses 32a and 32b, first and second hinge parts 24a and 24b along with hinge pivot pin 25, and gap 34. The dimensions of the fixtures can also be the same as the previously described fixtures for each size of fixtures A corresponding to a coupling size. Lower shaft portions 241a and 241b remain in cylindrical bores 221a and 221b of fixtures 220a and 220b. Shaft extensions 248a and 248b extend from the fixtures, as illustrated in FIG. 11 B. As illustrated in FIG. 11A, upper shaft portions 240a and 240b each have a shaft bore 246a, 246b to receive a respective shaft extension from the lower shaft portions.

The shaft extensions and the shaft bores are made to have a polygonal cross-sectional shape so the rotation of the upper shaft portions also rotate the lower shaft portions, as illustrated in FIG. 11 C for the section taken along line 11C—11C in FIG. 11 B. Extension bores 249a and 249b in fixtures 220a and 220b are made with a diameter smaller than the diameter of cylindrical bores 221a and 221b so that lower shaft portions 241a and 241b are held in place within the fixtures. Prying surfaces 244a and 244b are facing partial cage recesses 32a and 32b in a position to contact the cage of the coupling when the lower shafts are rotated. A separate lower fixture component, as illustrated in FIG. 11B, can be made for each coupling size, with one pair of handles being used for the different sizes of the fixtures. In another aspect of the invention, a separate tool such as a crescent wrench or a ratchet device conventional in the tool industry can be used to replace one or both upper shaft portions along with their respective lever arms.

Figures 12A, 12B:
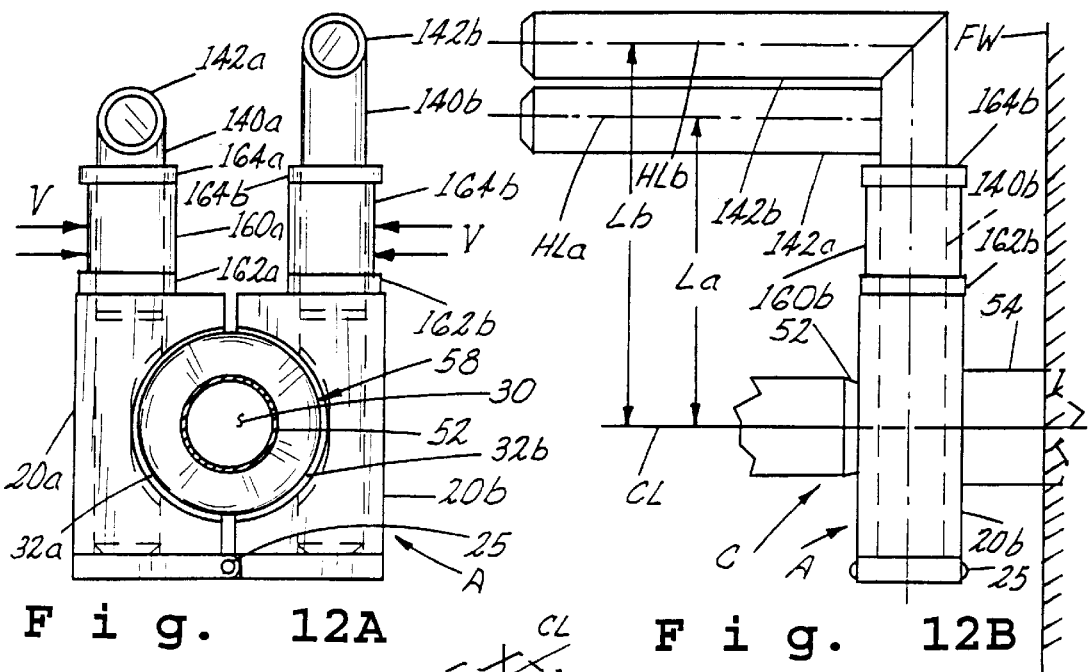
FIGS. 12A, 12B, 12C & 12D are front and side elevation views as well as top views of a further embodiment of the present invention where the pair of handles are made to be relatively short in length and of different length to work in a limited space (FIGS. 12A & 12B), wherein the first, second and third positions of the lever arms of the disconnect tool are selected so that the handles clear an adjacent fire wall (FIGS. 12B, 12C & 12D)

In yet another embodiment of the invention, allowance is made for working on tubular pipe or conduit where the working space around the conduit is limited. The lateral space from the tubular axis as well as the space along the tubular axis from the coupling can be limited. This limitation is typical of spring-lock couplings used in vehicular air conditioning systems where couplings in the conduit lines are near a fire wall between engine and passenger compartments. The disconnect tool illustrated in FIGS. 12A, 12B, 12C and 12D can be used where a limited working space exists. The same fixtures 20a and 20b as previously described are positioned around coupling C. Essentially the handles have been modified to provide this embodiment of the invention. In the initial installed position of the disconnect tool around the second fitting 54, lever arms 142a and 142b of the handles have a first position parallel to tubular axis CL, as illustrated in FIGS. 12A and 12B. This position establishes reference lines R for the lever arms.

Figure 12C:
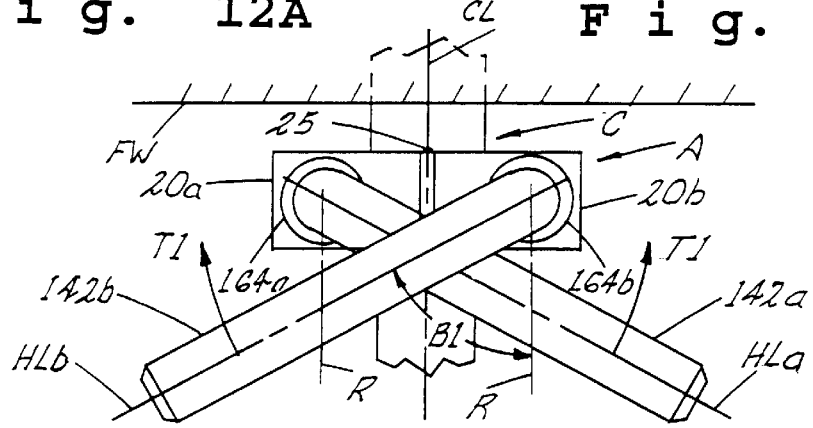
Figure 12D:
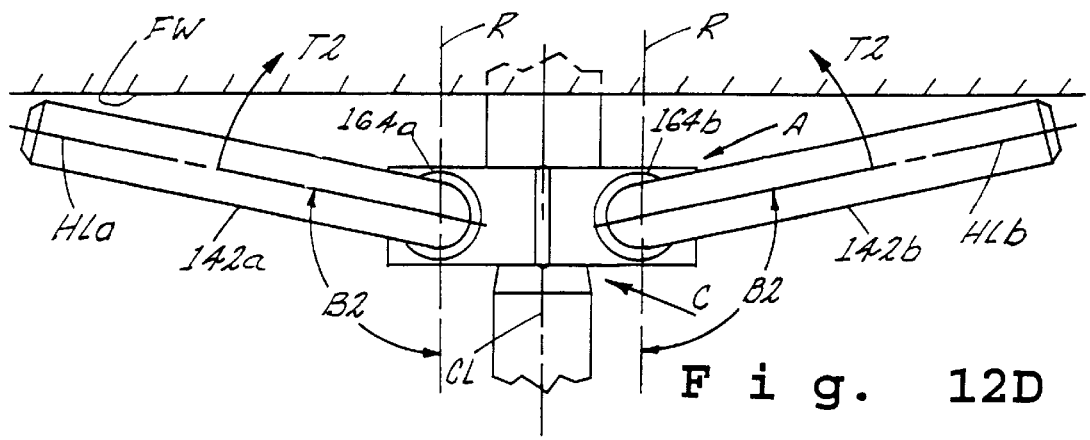

In this embodiment the operating modes are essentially the same as previously described, except for the relative location of the lever arms of the handles. In the first operating mode the fixtures are moved along the second fitting so that cage 58 of first fitting is positioned within cage recesses 32a and 32b, as previously described. The shafts 140a and 140b are made to have a different lengths La and Lb so that the lever arms move in separate planes to cross each other when applying a turning force T1, as illustrated in FIG. 12C. In the second operating mode the lever arms are rotated from a first position defined by reference line R through angle B1 to reach a second position as shown. This second position corresponds with the circular spring having been radially displaced within the chamber of the cage of the coupling.

In the first step of the third operating mode of the present embodiment, lateral forces V are applied to the shafts of the handles, as illustrated in FIG. 12A. The lateral forces provide the gripping forces necessary for fixtures 20a and 20b to rotate about the pivot pin 25 and to grip and hold second fitting 54 of the coupling. Short sleeves 160a and 160b can be added to shafts 140a and 140b for assisting the shafts in maintaining their freedom to rotate when the lever arms are turned. Bottom collars 162a and 162b as well as top collars 164a and 164b can be used to hold the sleeves in place on the shafts. Roller bearings can also be provided between the sleeves and the shafts. A conventional tool, such as vice grip pliers or water pliers, can be used to apply larger lateral forces V and increase the gripping action of fixtures A on coupling C. The conventional tool can be a type which will lock in place when gripping the sleeves and free-up the hands of the user. With the coupling being gripped by the fixtures, turning force T2 is applied in an opposite direction on the lever arms of the handles to rotate shafts 140a and 140b. The lever arms rotate back through the first position to the third position defined by angle B2 on the opposite rotational side of reference line R, as illustrated in FIG. 12C. The lever arms stop short of fire wall FW and complete the third operating mode by moving first fitting 52 of the coupling relative to the second fitting 54 along the tubular axis CL. Further axial and opposite forces on the first and second fittings will completely disconnect the tubular conduit at the coupling.

The disconnect tool of this invention provides for different tubular conduit sizes and corresponding connector sizes. The conventional spring-lock® connector for vehicle air conditioning and fuel lines is made in six sizes. The disconnect tool of this invention limits the number of different parts necessary to provide for the different sizes. In particular, the same handles can be used with different size fixtures. A tool set generally includes one pair of handles and a set of fixtures; being one for each connector size. The previous figures illustrate the disconnect tool for one connector size. The disconnect tool for a different connector size is illustrated in FIGS. 13a, 13B and 13C. The cross-sectional view of FIG. 13B is taken along line 13B—13B of FIG. 13A and the bottom view of FIG. 13C is taken along line 13C—13C of FIG. 13A. Essential differences include a central tool aperture 130 having a diameter D1, the outer diameter of partial cage recesses 132a and 132b and a handle spacing S1. In addition, fixtures 120a and 120b, along with hinges 124a and 124b, have a different lateral width. The handles can be the same including the shafts 40a and 40b, retainer cutouts 41a and 41b and prying surfaces 44a and 44b. As before, the prying surface remain exposed to cage apertures 132 to contact the installed cage of the connector when the shafts of the handles are rotated. Once again, the hinge parts are attached to the fixtures by fasteners 126a and 126b and pivot pin 125 provides pivotal axis P—P so that the fixtures can rotate with respect to one another to receive the coupling within central tool aperture 130. Annular collars 122a and 122b again provide the structure for unlocking the connector and gripping surfaces 123a and 123b are made to grip and hold the second fitting of the collar when pulling the coupling apart. The three operational modes previously discussed for the decoupling tool of FIGS. 9A, 9B and 9C are the same for decoupling the smaller coupling of this embodiment of the invention.

The fixtures and the handles of the disconnect tool are preferably made of a metallic material. It may be economical to make the pair of fixtures from a single steel block by boring and machining the block before cutting the block into to form the two fixtures. Alternately the fixtures may be cast and machined or of a composite material. The sleeves and the latch mechanism can be of a metallic, a plastic or a composite material with a low friction coating on the inside of the sleeve. Roller bearing are also possible. In addition, the collars of each fixture can be made as a separate part attached to the remaining fixture part. To obtain an effective gripping surface the collars can have a non-slip material layer bonded to their inside surface, or include a surface treatment of the collar itself. The tubular conduit and its coupling are of a material conventional in the art.

While a preferred embodiment of the invention has been described using specific terms, such description is for illustrative purposes only, and it is to be understood that changes and variations may be made without departing from the spirit or scope of the following claims.

What is claimed is:

1. A disconnect tool for a tubular conduit coupling, said coupling having first and second fittings with a circular spring for connecting ends of the conduit together along a tubular axis using a circular spring in a cage of the first fitting to contact a flared end of the second fitting, said tool comprising:

first and second fixtures being one connected with the other to provide a center aperture to receive the second fitting of the coupling;

an annular projecting collar formed in each fixture to define a cage aperture radially to the outside of said collars from the tubular axis, wherein said collars are disposed to the outside of the second fitting so that said collars are free to slide axially along the second fitting, enter the cage opening and make contact with the circular spring;

first and second handles each having a shaft, a lever arm extending from one end of said shaft and a prying surface formed near the other end of said shaft; and each one of said fixtures having a cylindrical bore to rotatable receive a respective handle so that said prying surfaces of said shafts are exposed to said cage apertures of said fixtures when said shafts are in an operational position within said fixtures, wherein said prying surfaces are positioned on each lateral side of the cage for contacting the cage by turning said lever arms relative to the tubular axis from a first non-contact position to other positions for displacing the circular spring and moving the fittings axially with respect to one another so that the coupling can be unlocked and disconnected.

2. The tool of claim 1 wherein said first and second handles have a second position relative to the tubular axis realized by turning said lever arms in one angular direction so that said prying surfaces contact-one axial side of the cage and move the collars into said second position to force the circular spring radially outward of the flared end of the first fitting within the cage and allow the coupling to be unlocked.

3. The tool of claim 2 wherein said first and second handles have a third position relative to the tubular axis realized by first forcing said shafts of said handles to move toward one another, so that said collars grip the second fitting, and second by turning said lever arms in an opposite annular direction so that said prying surfaces contact an opposite axial side of the cage and force the first and second fittings to move with respect to the one another along the tubular axis and free the coupling so that the coupling can be disconnected.

4. The tool of claim 1 wherein said first and second handles each have a hand grip sleeve placed around said shaft for helping to force said shafts of said handles to move toward one another so that said collars of said fixtures grip and hold said second fitting of the coupling, wherein said shafts are free to be rotated while said sleeves remain rotationally stationary.

5. The tool of claim 4 including a releasable latch mechanism carried by said sleeves so that gripping of the second fitting can be sustained without maintaining an outside gripping force on said sleeves.

6. The tool of claim 1 wherein said first and second fixtures are connected together with a hinge having a pivotal axis so that said fixtures can be pivotally separated one with respect to the other to receive the second fitting within said center tool aperture.

7. The tool of claim 1 wherein said lever arm of the first handle is at a first distance from the first fixture when said shaft is in said operational position in said bore of said first fixture and said lever arm of the second handle is at a second distance from said second fixture when said shaft is in said operational position in said bore of said second fixture, wherein said first distance is different than said second distance so that said lever arms rotate independent of one another when turned to rotate the shafts and make the prying surfaces contact the cage on both axial sides of the cage.

8. The assembly of claim 1 wherein said shaft of said handle is made in two parts including an upper shaft portion with a shaft bore, a lower shaft portion remaining in a cylindrical bore of a respective fixture and a shaft extension of said lower shaft portion extending from said respective fixture, wherein said upper shaft portion connects to said lower shaft portion by said shaft extension mating with said shaft bore so that turning a respective lever arm of the upper shaft portion rotates the lower shaft portion.

9. An assembly for connecting and disconnecting ends of a tubular conduit along a tubular axis comprising:

a first cylindrical fitting affixed to one of the ends of the tubular conduit, said first fitting having an exterior cage forming a chamber with a annular cage aperture;

a second cylindrical fitting affixed to the other one of the ends of the conduit, said second fitting having a flared end facing the first fitting so that said flared end of said second fitting is forced into said annular cage aperture when said first and second fittings are telescopically disposed together;

a circular spring adapted for resilient retention of said flared end within said cage, wherein the tubular conduit is connected along the tubular conduit axis;

first and second fixtures, being one hinged together with the other, provide a center tool aperture to receive said second fitting;

an annular projecting collar formed in each fixture is disposed to the outside of said second fitting so that said collars are free to slide axially along the second fitting, enter said cage aperture and arrive at a location wherein both collars make contact with the circular spring;

first and second handles each having a shaft, a lever arm extending from one end of said shaft and a prying surface formed near the other end of said shaft;

each one of said fixtures having a vertical bore to receive a respective shaft of said handles so that said prying surfaces of said shafts are exposed to said cage recesses of said fixtures with said lever arms in a first position; and said prying surfaces being located on each lateral side of said cage for contacting the cage when said lever arms of said handles are turned within said bores of said fixtures from said first position, wherein the coupling can be disconnected and the tubular conduit can be separated along the tubular axis.

10. The assembly of claim 9 wherein said first and second handles have (1) a second angular position relative to the tubular axis realized by turning said lever arms in one angular direction so that said prying surfaces contact one axial side of said cage and move said collars into a position to force the circular spring radially outward of the flared end of the first fitting within the cage and (2) a third angular position relative to the tubular axis realized by first forcing said handles to move toward one another, so that said collars grip said second fitting and second by turning said lever arms in an opposite annular direction so that said prying surfaces contact an opposite axial side of said cage and force said first and second fittings to move with respect to the one another along the tubular axis and free said coupling so that the tubular conduit can be disconnected.

11. The assembly of claim 9 wherein said shaft of said handle is made in two parts including an upper shaft portion with a shaft bore, a lower shaft portion remaining in a cylindrical bore of a respective fixture and a shaft extension of said lower shaft portion extending from said respective fixture, wherein said upper shaft portion connects to said lower shaft portion by said shaft extension mating with said shaft bore so that turning a respective lever arm of the upper shaft portion rotates the lower shaft portion.

12. A method for disconnecting a quick-connect type coupling of a tubular conduit along a tubular axis, said coupling characterized by first and second fittings including a cage of the first fitting with a annular cage aperture, a flared end of the second fitting and a circular spring adapted for resilient retention of the flared end within a chamber of the cage, said method including the steps of:

a) providing first and second fixtures of a size corresponding to the size of the tubular coupling, said fixtures each having a side cutout, a cylindrical bore and an annular projecting collar forming a partial cage recess;

b) hinging said fixtures together so that said side cutouts form a center tool aperture, said partial cage recesses forming an annular cage recess and said collars are placed around the second fitting;

c) providing a pair of handles each having a shaft and a lever arm extending from one end of said shaft and a prying surface formed near the other end of said shaft;

d) placing each handle shaft in a respective cylindrical bore of a respective fixture so that said prying surface is exposed to a respective partial cage recess, said handles being free to rotate within said bores;

e) displacing said hinged together fixtures axially along said second fitting so that said collars are forced through the annular cage aperture of the first fitting and contact the circular spring inside the cage when said lever arms of said handles are in a first position;

f) rotating the handles so that the lever arms are in a second position and said prying surfaces contact one axial side of the cage of the fitting and said collars radially displace the circular spring within the cage;

g) forcing said shafts of said pair of handles to move toward one another for gripping and. holding the second fitting with said collars of said fixtures; and h) rotating said handles to place the lever arms in a third position so that said prying surfaces contact the cage of the first fitting on an opposite axial side and move the first and second fittings of the coupling axially apart with respect to one another along the tubular axis so that the coupling can be disconnected.

13. The method of claim 12 wherein the step of providing a pair of handles includes the steps of:

providing a first handle with a lever arm at a first distance from said first fixture; and providing a second handle with a lever arm at a second distance from said second fixture, wherein said first and second distances are such that said lever arms will be separated one from the other when rotating said lever arms to said first and second positions.

14. The method of claim 12 wherein the step of providing a pair of handles includes the steps of:

forming said shaft of each handle in two parts being an upper shaft portion and a lower shaft portion, said lower shaft portion being generally contained in said cylindrical bore of a respective fixture with a shaft extension extending form said fixture, wherein said lever arm of the handle extends from said upper shaft portion;

connecting said upper shaft portion to said shaft extension using a male and female type interface between said upper shaft portion and said shaft extension; and rotating said lever arm so that said lower shaft portion is rotated through the interface to move said prying surface of the lower shaft portion to contact said cage.

15. The method of claim 12 wherein the step of providing first and second fixtures includes the steps of:

providing a plurality of other first and second fixtures of a different size corresponding to other known sizes of tubular couplings;

using said pair of handles for said plurality of other first and second fixtures to disconnect each coupling of a set to be disconnected.

16. The method of claim 12 wherein the step of forcing said pair of handles to move toward one another includes the steps of:

providing a sleeve placed around each handle so that said handles are free to rotate within said sleeves; and applying lateral forces to the sleeves that are transmitted to said handles and maintained said gripping and holding of the second fitting.

17. The method of claim 16 wherein the step of applying and maintaining lateral forces includes the step of providing a latch mechanism carried by said sleeves that holds the handles together for gripping and holding the second fitting without assistance from the user.

* * * * *